United States Patent
Zhang et al.

(10) Patent No.: US 10,036,635 B2
(45) Date of Patent: Jul. 31, 2018

(54) MULTI-AXIS MEMS RATE SENSOR DEVICE

(71) Applicant: mCube Inc., San Jose, CA (US)

(72) Inventors: Wenhua Zhang, San Jose, CA (US); Sudheer Sridharamurthy, San Jose, CA (US); Shingo Yoneoka, San Jose, CA (US); Terrence Lee, San Jose, CA (US)

(73) Assignee: mCube Inc., San Jose, CA (US)

( * ) Notice: Subject to any disclaimer, the term of this patent is extended or adjusted under 35 U.S.C. 154(b) by 375 days.

(21) Appl. No.: 14/163,789

(22) Filed: Jan. 24, 2014

(65) Prior Publication Data
US 2014/0311247 A1  Oct. 23, 2014

Related U.S. Application Data

(60) Provisional application No. 61/757,085, filed on Jan. 25, 2013, provisional application No. 61/757,088, filed on Jan. 25, 2013.

(51) Int. Cl.
*B81B 3/00* (2006.01)
*G01C 19/574* (2012.01)

(52) U.S. Cl.
CPC .................................. *G01C 19/574* (2013.01)

(58) Field of Classification Search
CPC ..... G01P 15/18; G01P 15/125; G01C 19/574; H01L 2924/0014
USPC .......................................................... 73/514
See application file for complete search history.

(56) References Cited

U.S. PATENT DOCUMENTS

| 5,736,732 | A  | 4/1998  | Possin et al.    |
|-----------|----|---------|------------------|
| 5,825,385 | A  | 10/1998 | Silverbrook      |
| 6,134,961 | A  | 10/2000 | Touge et al.     |
| 7,595,209 | B1 | 9/2009  | Monadgemi et al. |
| 8,156,806 | B1 | 4/2012  | Cardarelli       |
| 8,164,171 | B2 | 4/2012  | Lin et al.       |
| 8,171,792 | B2 | 5/2012  | Sameshima        |

(Continued)

FOREIGN PATENT DOCUMENTS

| CN | 102854998 A | 1/2013 |
|----|-------------|--------|
| CN | 103303859   | 9/2013 |

(Continued)

OTHER PUBLICATIONS

China Intellectual Property Office office action for application CN201310076476.9 dated Apr. 15, 2015.

(Continued)

*Primary Examiner* — Natalie Huls
*Assistant Examiner* — Monica S Young
(74) *Attorney, Agent, or Firm* — Kilpatrick Townsend & Stockton LLP

(57) ABSTRACT

A MEMS rate sensor device. In an embodiment, the sensor device includes a MEMS rate sensor configured overlying a CMOS substrate. The MEMS rate sensor can include a driver set, with four driver elements, and a sensor set, with six sensing elements, configured for 3-axis rotational sensing. This sensor architecture allows low damping in driving masses and high damping in sensing masses, which is ideal for a MEMS rate sensor design. Low driver damping is beneficial to MEMS rate power consumption and performance, with low driving electrical potential to achieve high oscillation amplitude.

8 Claims, 4 Drawing Sheets

(56) References Cited

U.S. PATENT DOCUMENTS

| | | | |
|---|---|---|---|
| 8,205,498 B2 | 6/2012 | Hsu et al. | |
| 8,516,886 B2* | 8/2013 | Acar | G01C 19/5712 73/504.08 |
| 8,878,312 B2 | 11/2014 | Hung et al. | |
| 9,249,012 B2 | 2/2016 | Lee | |
| 9,276,080 B2 | 3/2016 | Sridharamurthy et al. | |
| 2003/0110858 A1* | 6/2003 | Kim | G01C 19/5762 73/504.02 |
| 2003/0196490 A1 | 10/2003 | Cardarelli | |
| 2003/0216884 A1 | 11/2003 | Cardarelli | |
| 2004/0121564 A1 | 6/2004 | Gogoi | |
| 2004/0231420 A1 | 11/2004 | Xie et al. | |
| 2007/0029629 A1 | 2/2007 | Yazdi | |
| 2007/0164378 A1 | 7/2007 | MacGugan | |
| 2008/0028855 A1* | 2/2008 | Kano | G01C 19/5698 73/504.12 |
| 2008/0115579 A1 | 5/2008 | Seeger | |
| 2008/0163687 A1* | 7/2008 | Kranz | B81C 1/00246 73/514.32 |
| 2008/0314147 A1 | 12/2008 | Nasiri et al. | |
| 2009/0064781 A1* | 3/2009 | Ayazi | G01C 19/5719 73/504.12 |
| 2009/0280594 A1 | 11/2009 | Mehregany | |
| 2009/0309203 A1 | 12/2009 | Seppala et al. | |
| 2010/0071467 A1* | 3/2010 | Nasiri | G01C 19/5719 73/504.12 |
| 2010/0281977 A1* | 11/2010 | Coronato | G01C 19/5712 73/504.14 |
| 2011/0030473 A1 | 2/2011 | Acar | |
| 2011/0031565 A1 | 2/2011 | Marx et al. | |
| 2011/0121416 A1 | 5/2011 | Quevy et al. | |
| 2011/0265565 A1 | 11/2011 | Acar | |
| 2011/0265574 A1 | 11/2011 | Yang | |
| 2012/0012970 A1 | 1/2012 | Xu et al. | |
| 2012/0061172 A1 | 3/2012 | Yacine | |
| 2012/0223726 A1 | 9/2012 | Zhang et al. | |
| 2012/0248615 A1 | 10/2012 | Chien et al. | |
| 2012/0326248 A1 | 12/2012 | Daneman et al. | |
| 2013/0042686 A1 | 2/2013 | Lin et al. | |
| 2013/0082338 A1 | 4/2013 | Pan et al. | |
| 2013/0236988 A1 | 9/2013 | Sridharamurthy et al. | |
| 2013/0247662 A1 | 9/2013 | Jin et al. | |
| 2013/0247666 A1 | 9/2013 | Acar | |
| 2013/0328139 A1 | 12/2013 | Acar | |
| 2014/0311242 A1 | 10/2014 | Lee et al. | |
| 2014/0311247 A1 | 10/2014 | Zhang et al. | |
| 2015/0000400 A1* | 1/2015 | Cazzaniga | G01C 19/5747 73/504.12 |
| 2015/0111332 A1 | 4/2015 | Lee | |

FOREIGN PATENT DOCUMENTS

| | | | |
|---|---|---|---|
| EP | 2135840 A2 | 12/2009 | |
| EP | 2339293 B1 * | 11/2013 | G01C 19/5747 |
| TW | 201020548 A | 6/2010 | |
| TW | 201110274 A | 3/2011 | |
| TW | 201117349 A | 5/2011 | |
| TW | 201213764 A | 4/2012 | |
| TW | 201229516 A | 7/2012 | |
| TW | 201238032 A | 9/2012 | |
| TW | 201435307 | 9/2014 | |
| WO | WO2010092399 A2 | 8/2010 | |
| WO | 2012/037539 A1 | 3/2012 | |

OTHER PUBLICATIONS

Office Action issued by the Taiwan Patent Office for patent application TW102108387 (dated Feb. 17, 2015).
Taiwan Patent Office Office Action for patent application TW103103001 (dated Aug. 6, 2015).
Taiwan Patent Office Office Action for patent application TW103103000 (dated May 11, 2015).
Search Report for European patent application EP14171673.8 (dated Nov. 10, 2014), 8 pages.
Search Report and Written Opinion for European patent application EP14152747 (dated Sep. 3, 2014), 11 pages.
Sun Sensing and control electronics design for capacitive CMOS-MEMS inertial sensors, PhD. Dissertation University of Florida (copyright 2002), sections 2.2.4, 7.3, chapters 3 and 6.
Tatar et al. "Quadrature-Error Compensation and Corresponding Effects on the Performance of Fully Decoupled MEMS Gyroscopes," Journal of Microelectromechanical Systems, vol. 21, pp. 656-667 (Jun. 2012).
Xie "Gyroscope and Micromirror Design Using Vertical Axis CMOS-MEMS Actuation and Sensing," PhD. Dissertation Carnegie Institute of Technology (copyright 2002), sections 3.2, 5.3.2.2, 6.2.8, chapter 6.
European Patent Application No. 14152747.3, "Office Action" dated Mar. 4, 2016, 6 pages.
U.S. Appl. No. 13/788,503, Advisory Action dated May 29, 2015, 3 pages.
U.S. Appl. No. 13/788,503, Final Office Action dated Mar. 11, 2015, 11 pages.
U.S. Appl. No. 13/788,503, Non-Final Office Action dated Jun. 24, 2015, 14 pages.
U.S. Appl. No. 13/788,503, Non-Final Office Action dated Oct. 3, 2014, 9 pages.
U.S. Appl. No. 13/788,503, Notice of Allowance dated Sep. 25, 2015, 12 pages.
U.S. Appl. No. 13/788,503, Restriction Requirement dated Jul. 17, 2014, 7 pages.
U.S. Appl. No. 14/521,441, Non-Final Office Action dated Apr. 28, 2015, 9 pages.
U.S. Appl. No. 14/521,441, Notice of Allowance dated Sep. 21, 2015, 7 pages.
Taiwan Application No. 103103001, Office Action dated Aug. 4, 2015, 14 pages (Original document and English translation).
Taiwan Application No. 103103001, Office Action dated Mar. 8, 2016, 5 pages (Original document and English translation).
Office Action for U.S. Appl. No. 14/162,718 dated Dec. 27, 2015, 19 pages.
U.S. Appl. No. 14/162,718, Final Office Action dated Jan. 4, 2017, 18 pages.
U.S. Appl. No. 14/162,718, Non-Final Office Action dated Aug. 26, 2016, 21 pages.
U.S. Appl. No. 14/162,718, Non-Final Office Action dated Jun. 16, 2017, 22 pages.
Taiwan Application No. 103103001, Search Report dated Jul. 18, 2017, 2 pages.
U.S. Appl. No. 14/162,718, Final Office Action dated Oct. 17, 2017, 28 pages.

* cited by examiner

MULTI-AXIS MEMS RATE SENSOR DEVICE

CROSS-REFERENCES TO RELATED APPLICATIONS

The present application claims priority to and incorporates by reference, for all purposes, the following patent applications: U.S. Provisional App. 61/757,088, filed Jan. 25, 2013, and U.S. Provisional App. 61/757,085, filed Jan. 25, 2013. The present application also incorporates by reference, for all purposes, the following pending patent application: U.S. patent application Ser. No. 13/788,503, filed Mar. 7, 2013.

BACKGROUND OF THE INVENTION

The present invention is directed to MEMS (Micro-Electro-Mechanical-Systems). More specifically, embodiments of the invention provide methods and structure for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

The present invention is directed to MEMS (Micro-Electro-Mechanical-Systems). More specifically, embodiments of the invention provide methods and structure for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

In an embodiment, the sensor device includes a MEMS rate sensor configured overlying a CMOS substrate. The MEMS rate sensor can include a driver set, with four driver elements, and a sensor set, with six sensing elements, configured for 3-axis rotational sensing. This sensor architecture allows low damping in driving masses and high damping in sensing masses, which is ideal for a MEMS rate sensor design. Low driver damping is beneficial to MEMS rate power consumption and performance, with low driving electrical potential to achieve high oscillation amplitude.

Various additional objects, features, and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention is directed to MEMS (Micro-Electro-Mechanical-Systems). More specifically, embodiments of the invention provide methods and structures for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Figure 1:
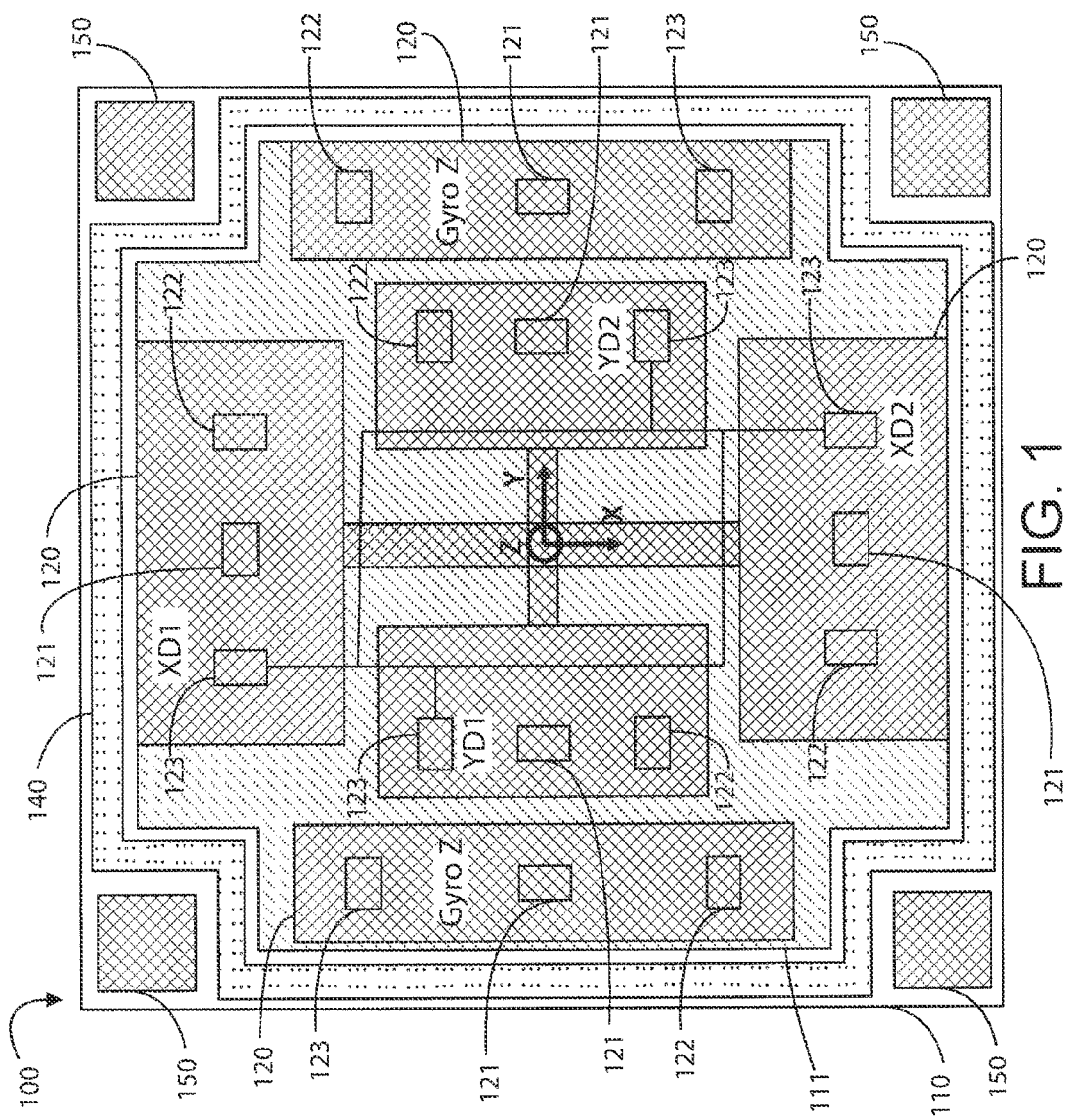
FIG. 1 is a simplified schematic diagram illustrating a MEMS rate sensor device according to an embodiment of the present invention.

FIG. 1 is a simplified schematic diagram illustrating an integrated MEMS rate sensor device according to an embodiment of the present invention. As shown, the device 100 can include a 3-axis gyroscope 120 overlying substrate 110 in a single package cavity. The gyroscope 120 is located an outside portion of the chip or arranged around a central region of the chip substrate. Other combinations of MEMS, sensors, and the like, can be used as well.

In an embodiment, the present invention provides a 3-axis rate sensor, or Gyroscope, that can be categorized as a vibratory gyroscope. This device can depend on the Coriolis effect to convert driving energy (driver) to sensing element (s) (sensor), and to detect rotational rate signals. In a specific embodiment, the MEMS rate sensor 120 is configured overlying a fully processed CMOS substrate 110. The rate sensor 120 can be configured an outer portion of the CMOS surface region. The sensor will be capped in a vacuum cavity, which can be hermetically sealed. In an embodiment, the sensor device can include single crystal, polycrystalline, amorphous, or other silicon materials and combinations thereof.

In a specific embodiment, the all portions of the gyroscope structure can be formed from a single mask layer and configured with a hollow middle portion. This single layer can incorporate each of the sensed gyro motions. X, Y, and Z axis sensors of the integrated gyroscope do not need to be formed separately, which reduces the number of steps in fabrication.

In a specific embodiment, the gyroscope 120 can include anchors 121, which are coupled to the semiconductor substrate 110. Each of the elements 120 can be a proof mass for a designated sensing axis (X, Y, and Z) as denoted in FIG. 1. Also, each of these elements 120 can include corresponding displacement sensors 122 for each sensing axis. Furthermore, each of gyro elements 120 can include a displacement driver 123 configured to displace the proof mass. The x-axis, y-axis, and z-axis displacement sensors 122 provide data in response to the displacement of the proof mass 120 by the displacement driver 123.

In a specific embodiment, the sensor device can have four drivers: YD1, YD2, XD1, and XD2 (shown in FIG. 1). These driving elements 123 are shown near each of the sensing masses 120. They can be mechanically coupled so that they move in certain patterns simultaneously. The mechanical coupling can be achieved using a flexible beam to connect the drivers to each other.

In an embodiment, bond pads can be configured in one or more of the corners of the die, substrate, or package. In a specific embodiment, all four corners have dedicated area for electrical bonding pads 150. There is no additional top/bottom, or left/right area to be allocated to bonding pads. This architecture can maximize the sensor area, and hence achieve better performance. The sensors are all symmetric in geometry, which is beneficial to sensor temperature performance, due to packaging effect.

In an embodiment, the present invention can include a MEMS rate sensor device. The device can include a driver set coupled to a sensor set. The driver set can include a plurality driving elements, and the sensor set can include a plurality of sensing elements and a plurality of sensing masses. These sets can be formed overlying a substrate member, which can be a single crystal silicon substrate.

In a specific embodiment, the plurality of driving elements can include a first, second, third, and fourth driving element. The first and second driving elements can be a first and second x-driving element, respectively. The third and fourth driving elements can be a first and second y-driving element, respectively. One or more driving elements, such as a fifth and sixth driving element configured as a first and second z-driving element, may be provided for the z-axis as well.

In a specific embodiment, the plurality of sensing elements can include corresponding first through sixth sensing elements and first through sixth sensing masses. The first and second sensing elements can be coupled to the first and second sensing masses, which correspond to a first and second x-sensing element, respectively. Similarly, the third and fourth sensing elements and masses can correspond to a first and second y-sensing element, and the fifth and sixth sensing elements and masses can correspond to a first and second z-sensing element. Also, the first and second sensing elements of the x and y-axis can each be coupled to a single sensing mass instead of two separate masses.

In an embodiment, the present invention can include a MEMS device comprising a layer of silicon crystal material, which can be single crystal silicon. This layer of silicon crystal material can include a set of x-axis elements, a set of y-axis elements, and a set of z-axis elements. Each of these sets can include a rotational physical data portion, a rotational proof pass portion, and a drive portion. The z-axis rotational proof mass portion can include both the x and y axis proof mass portions.

A substrate can be coupled to the layer of silicon crystal material, which can include a rotation electronic feedback portion for each axis portion. Each of these feedback portions can be configured to convert physical data from the rotation physical data portion into rotation electrical data. In a specific embodiment, the rotation physical data portion for each axis can include a first capacitor plate. The rotation electronic data portion can include a second capacitor plate. The physical data that is converted can involve the movement of the first capacitor plate relative to the second capacitor plate in this capacitor plate pair.

Figure 2A:
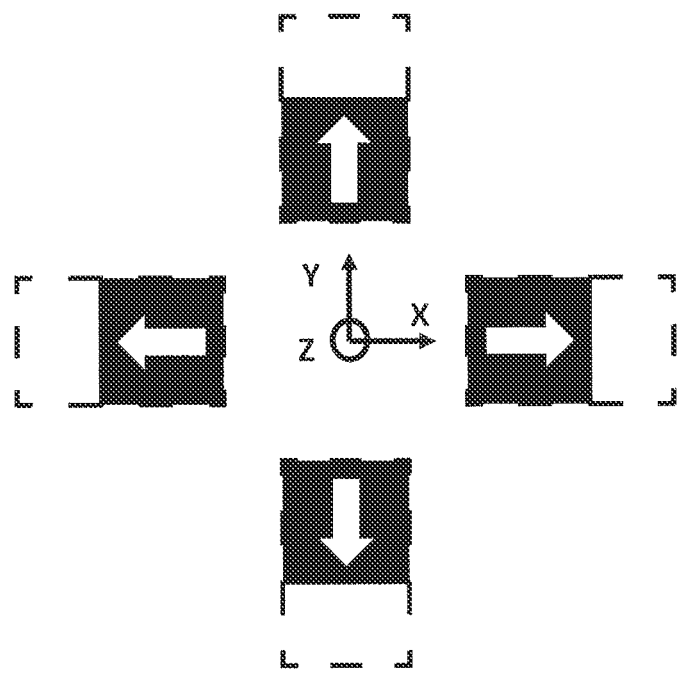
FIG. 2A is a simplified diagram illustrating a MEMS rate sensor device according to an embodiment of the present invention.
Figure 2B:
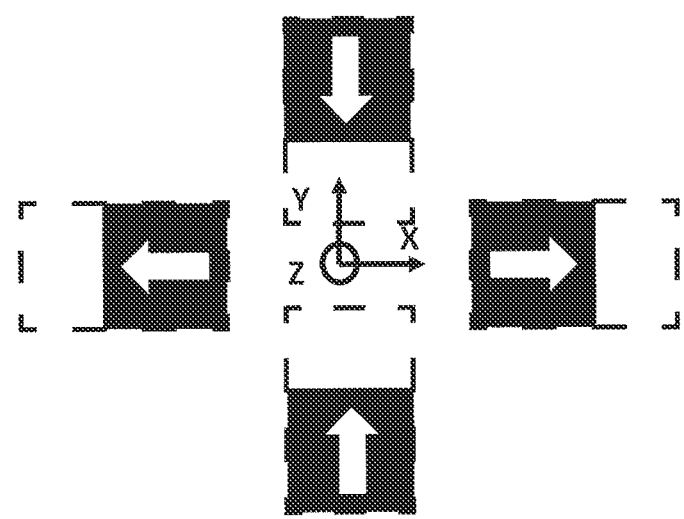
FIG. 2B is a simplified diagram illustrating a MEMS rate sensor device according to an embodiment of the present invention.

In a specific embodiment, each of the proof mass portions for each axis can include a first proof mass portion and a second proof mass portion. The drive portion can also include a first and second driver for each axis portion. The first driver for an axis can drive the first proof mass of that axis, while the second driver drives the second proof mass. These driver pairs can have a phase relation selected from in-phase, 180 degrees out-of-phase, or the like. Further details regarding the driving phases are shown in FIGS. 2A and 2B. As stated previously, the driver pairs can be combined into single drivers.

FIGS. 2A and 2B are simplified diagrams illustrating a MEMS rate sensor device according to an embodiment of the present invention. The driver motion pattern can be illustrated in FIG. 2. In FIG. 2A, all four driving elements move simultaneously in and out in plane (XY plane), while in FIG. 2B, left and right elements move out, as the top and bottom elements move in.

According to a specific embodiment, as the sensor is experiencing a rotational signal, which has components in all three axes, the sensing elements will move in a certain pattern. The sensing element motion signal has a carrier signal with the same frequency as the driving element motion. By demodulating the sensing element motion signal, the sensor rotational signal can be decoded.

X sensing elements move out of plane (along Z axis), where the top and bottom masses move in an Anti-phase pattern (when the top mass moves in +Z, the bottom mass moves in −Z). Y sensing elements move in a similar pattern to X sensing elements. Z Sensing elements move in-plane along Y axis. i.e. as the left element moves in +y, the right element moves in −y. According to various embodiments of the present invention, the rate sensor device can include some or all of the following features:

The sensor can be made of single crystal silicon. Compared to a polysilicon rate sensor, this device has the potential to have larger mass, and hence is more stable and less noisy than conventional models. Such a sensor also has a higher quality factor, compared to the sensors made of Polysilicon, and therefore uses smaller electrical signal to drive.

In an embodiment, the sensor uses one set of drivers for all 3 axis rotational signal sensing. This design minimizes signal coupling in the sensing output between multiple driving signals and save CMOS chip area. All 4 drivers are mechanically coupled, which provides a more robust and stable driver oscillation. Designs can be further simplified by dedicating two blocks (instead of four) as driving finger areas (e.g. YDP and YDN or XDP and XDN), which will make the design more efficient in both mechanical element design and electrical signal routing.

Sensing masses are mechanically coupled, between X sensing elements: XSP (top) and XSN (bottom), Y sensing elements: YSP (left) and YSN (right), Z sensing elements: ZS1 (left) and ZS3 (right). This design provides better common mode rejection and better external disturbance rejection. Z sensing elements has additional common mode rejection by using ZSP and ZSN next to each other in each sensing element.

The sensor architecture allows low damping in driving masses and high damping in sensing masses, which is ideal for a Gyroscope rate sensor design. All drivers move in-plane and damping is dominated by Couette flow damping, which is usually low, compared to squeezed-film damping. Low driver damping is beneficial to Gyro power consumption and performance, with low driving electrical potential to achieve high oscillation amplitude. Sensing elements are dominated by Squeezed film damping, where X and Y sensing elements move out-of-plane, and Z sensing elements move in-plane, but use parallel plate type of sensing, hence the damping is dominated by squeezed-film damping.

Figure 3:
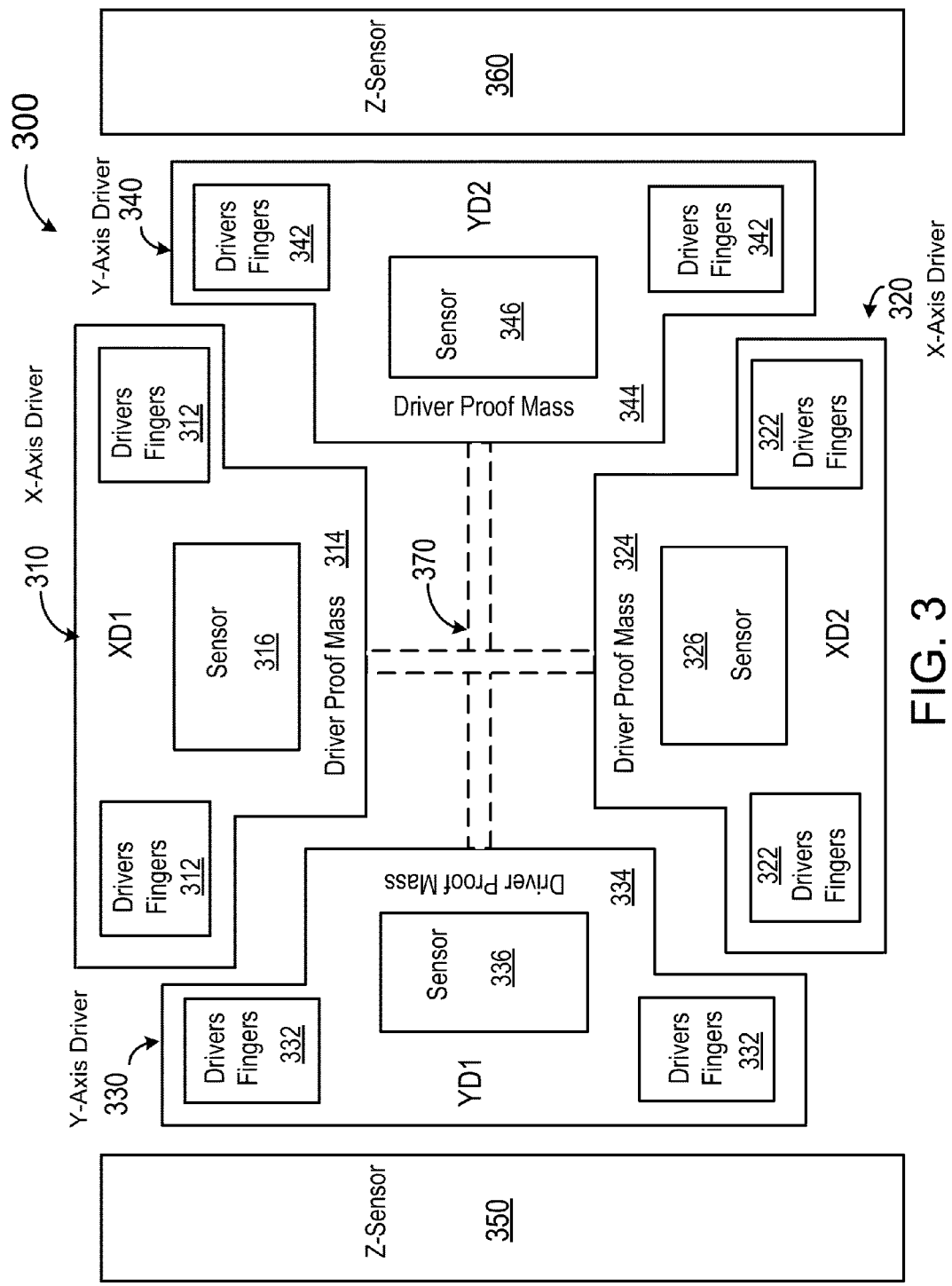
FIG. 3 is a simplified schematic diagram illustrating a MEMS rate sensor device according to an embodiment of the present invention.

FIG. 3 is a simplified schematic diagram illustrating a MEMS rate sensor device according to an embodiment of the present invention. FIG. 3 is based on FIG. 1 of U.S. Provisional App. No. 61/757,085, filed Jan. 25, 2013, which is incorporated by reference and from which this application claims priority. FIG. 1 in U.S. Provisional App. No. 61/757, 085 is presented as FIG. 4 below.

In an embodiment, an MEMS rate sensor device 300 includes a plurality of drivers, wherein the plurality of drivers are coupled so that they move in patterns simultaneously. The MEMS rate sensor device also includes a plurality of sensors, wherein each of the plurality of sensors is disposed inside and being surrounded by a corresponding driver.

As shown in FIG. 3, the plurality of drivers includes a first x-axis driver 310 (XD1), a second x-axis driver 320 (XD2), a first y-axis driver 330 (YD1), and a second y-axis driver 340 (YD2). The drivers are coupled mechanically by flexible beams 370. In this embodiment, each of the plurality of drivers includes one or more driving fingers and a driver proof mass. For example, x-axis driver 310 includes driver fingers 312 and a driver proof mass 314; x-axis driver 320 includes driver fingers 322 and a driver proof mass 324; y-axis driver 330 includes driver fingers 332 and a driver proof mass 334; and y-axis driver 340 includes driver fingers 342 and a driver proof mass 344. In this embodiment, the driver proof mass of each of the plurality of drivers are coupled by flexible beams 370.

In FIG. 3, MEMS rate sensor device 300 also has a plurality of sensors, including a first x-axis sensor 316, a second x-axis sensor 326, a first y-axis sensor 336, and a second y-axis sensor 346. In some embodiment, sensor 316 disposed inside and being surrounded by the driver 310, sensor 326 disposed inside and being surrounded by the driver 320, sensor 336 disposed inside and being surrounded by the driver 330, and sensor 346 disposed inside and being surrounded by the driver 340.

In some embodiments, a plurality of sensors can also include a first z-axis sensor 350 and a second z-axis sensor 360. In some embodiments, as described above, the first and second x-axis sensors, 316 and 326, are configured to move out of plane in the z-axis, the first and second y-axis sensors, 336 and 346, are configured to move out of plane in the z-axis, and the first and second z-axis sensors, 356 and 366, are configured to move in plane along the y-axis. Therefore, the plurality of sensors can be configured for 3-axis rotational sensing.

In some embodiments, a MEMS rate sensor device can include a substrate member having a surface region, a CMOS IC layer overlying the surface region, and a MEMS rate sensor overlying a CMOS surface region. In an embodiment, the MEMS rate sensor device can include the features described above in connection with MEMS rate sensor device 300.

In some embodiments, as shown in FIG. 3, z-axis sensor 350 disposed to an outside edge of driver 330 and away from the flexible beams 370, and sensor 360 disposed to an outside edge of driver 340 and away from flexible beams 370.

Figure 4:
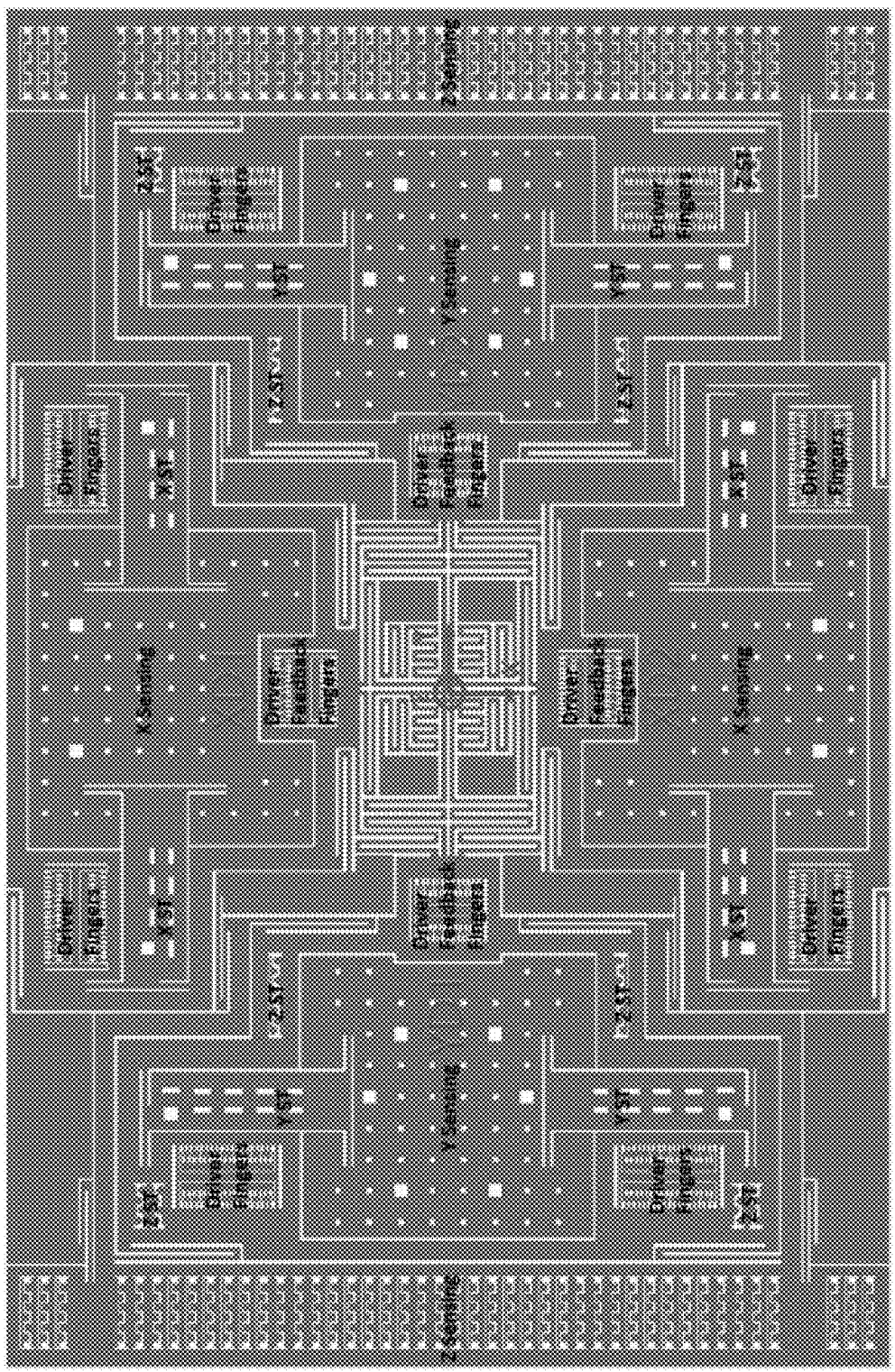
FIG. 4 is a top view of an integrated circuit (IC) die illustrating a MEMS rate sensor device according to an embodiment of the present invention.

FIG. 4 is a top view of an integrated circuit (IC) die illustrating a MEMS rate sensor device according to an embodiment of the present invention. FIG. 4 is the same as FIG. 1 of U.S. Provisional App. No. 61/757,085, filed Jan. 25, 2013, which is incorporated by reference and from which this application claims priority. FIG. 4 is reproduced here for reference.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:
1. A MEMS device comprising:
   a layer of silicon crystal material comprising:
      a first axis driver proof mass portion;
      a first x-axis driver fingers portion;
      a first x-axis rotational sensor physical data portion;
      a second x-axis driver proof mass portion;
      a second x-axis driver fingers portions;
      a second x-axis rotational sensor physical data portion;
      a first y-axis driver proof mass portion;
      a first y-axis driver fingers portion;
      a first y-axis rotational sensor physical data portion;
      a second y-axis driver proof mass portion;

a second y-axis driver fingers portion;
a second y-axis rotational sensor physical data portion;
a first z-axis rotational sensor physical data portion; and
a second z-axis rotational sensor physical data portion;
wherein:
the first and second x-axis driver proof mass portions and the first and second y-axis driver proof mass portion are coupled together with flexible beams;
the first and second z-axis rotational sensor physical data portions are separated and disposed to an outside and an opposite edge of the first and second y-axis driver proof mass portions; and
the first and second z-axis rotational sensor physical data portions are separated from the flexible beams;
wherein:
the first x-axis rotational sensor physical data portion is disposed inside and being completely surrounded by the first x-axis driver proof mass portion;
the second x-axis rotational sensor physical data portion is disposed inside and being completely surrounded by the second x-axis driver proof mass portion;
the first y-axis rotational sensor physical data portion is disposed inside and being completely surrounded by the first y-axis driver proof mass portion; and
the second y-axis rotational sensor physical data portion is disposed inside and being completely surrounded by the second y-axis driver proof mass portion.

2. The device of claim 1 further comprising:
a substrate coupled to the layer of silicon crystal material comprising:
an x-axis rotation electronic feedback portion configured to convert physical data from the x-axis rotation physical data portion into x-axis rotation electrical data;
a y-axis rotation electronic feedback portion configured to convert physical data from the y-axis rotation physical data portion into y-axis rotation electrical data; and
a z-axis rotation electronic feedback portion configured to convert physical data from the z-axis rotation physical data portion to z-axis rotation electrical data.

3. The device of claim 2 wherein the x-axis rotation electrical data comprises an x-axis rotation capacitance value.

4. The device of claim 2 wherein the x-axis rotation sensor physical data portion comprises a first capacitor plate.

5. The device of claim 4
wherein the x-axis rotation electronic data portion comprises a second capacitor plate; and
wherein the physical data comprises measurement of movement of the first capacitor plate relative to the second capacitor plate.

6. The device of claim 1 wherein the x-axis driver proof mass portion comprises a first x-axis proof mass and a second x-axis proof mass;
wherein the x-axis driver fingers portion comprises a first driver fingers and a second driver fingers; and
wherein the first driver fingers drives the first driver proof mass;
wherein the second driver fingers drives the second driver proof mass; and
wherein the first driver fingers and second driver fingers have a phase relation selected from a group consisting of: in-phase, 180 degrees out-of-phase.

7. The device of claim 1 wherein the y-axis driver proof mass portion comprises a first y-axis proof mass and a second y-axis proof mass;
wherein the y-axis driver fingers portion comprises a first y-axis driver fingers and a second y-axis driver fingers; and
wherein the first driver fingers drives the first y-axis proof mass;
wherein the second driver fingers drives the second y-axis proof mass; and
wherein the first y-axis driver fingers and second-axis driver fingers have a phase relation selected from a group consisting of: in-phase, 180 degrees out-of-phase.

8. The device of claim 1, wherein the x-axis driver proof mass portion and the y-axis driver proof mass portion are coupled to each other with flexible beams.

* * * * *